March 14, 1961 L. L. BITTERMAN ET AL 2,974,996
SIDE LOADING TRAILER
Filed May 29, 1958
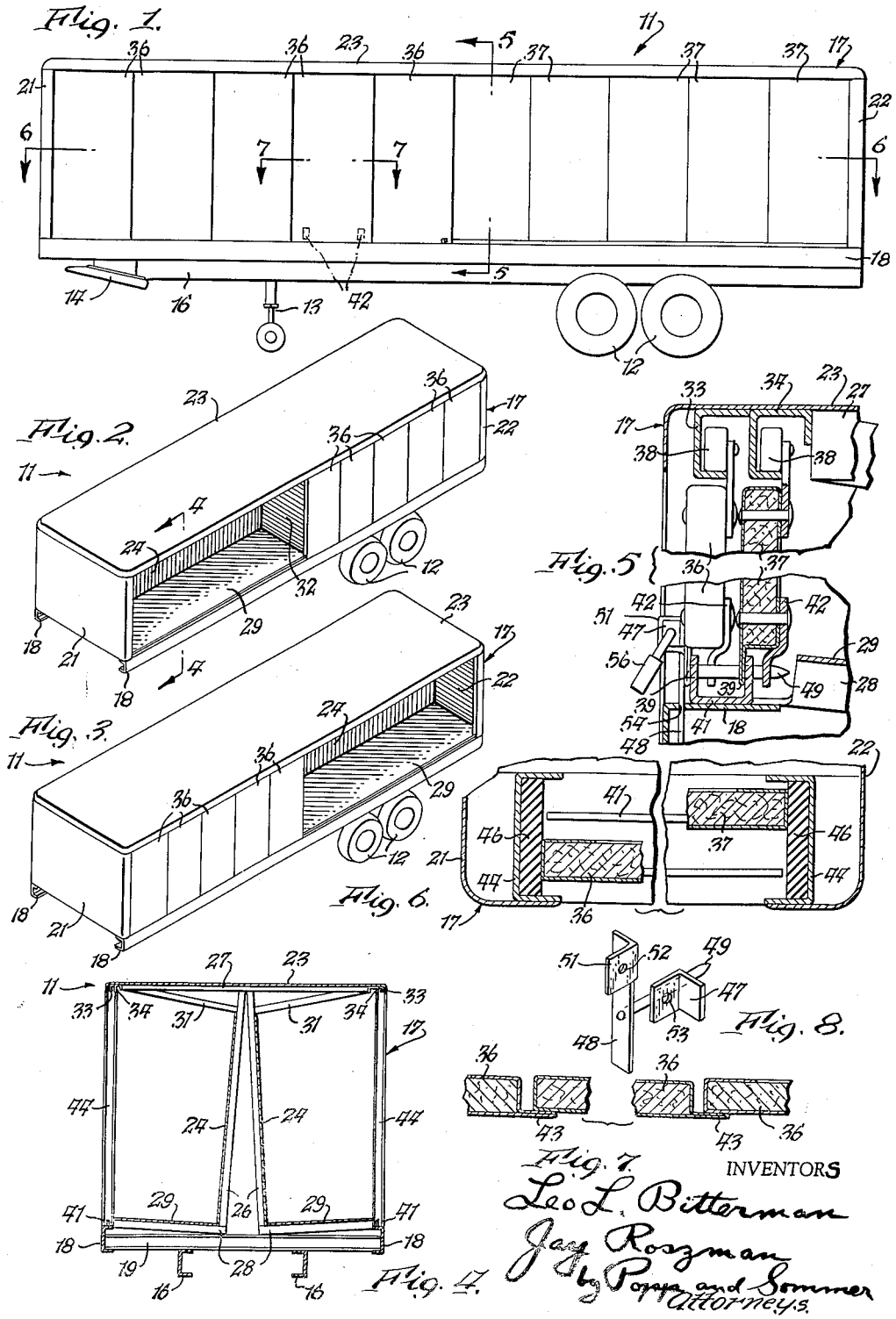
INVENTORS
Leo L. Bitterman
Jay Roszman
by Pops and Sommer
Attorneys

2,974,996

SIDE LOADING TRAILER

Leo L. Bitterman, 20 State St., Akron, N.Y., and Jay Roszman, Rapids, N.Y.; said Roszman assignor to said Bitterman Filed May 29, 1958, Ser. No. 738,835

6 Claims. (Cl. 296—24)

This invention relates to load carrying vehicles, and more particularly to a side loading trailer.

The development of more and better roads has resulted in the use of larger truck trailers for transporting commodities. The large trailers in use, generally have doors on the rear thereof, and occasionally side doors, as on moving vans. While such door arrangements may be satisfactory for many of the commodities being transported, they do not afford the most efficient loading and unloading arrangement for palletized loads, such as cases of beverages, etc. Such palletized loading is generally done with the aid of lift trucks, and such door arrangements do not allow the use of more than one truck in the trailer at one time. In addition, a loading platform is usually required for loading or unloading trailers having such door arrangements, hence, the absence of loading platform facilities necessitates the use of manual handling in place of the more efficient lift trucks.

The trailer of the present invention makes possible the more efficient loading and unloading of palletized loads. It features a plurality of slidable side doors on each side of the trailer, which provide access to the full length of the trailer. As a result, the trailer may be loaded by the use of more than one lift truck, and the need for a loading platform is eliminated.

Another feature afforded by the trailer of the invention is that any stack of palletized loads may be removed from the trailer without disturbing or removing other loads, as is the case with trailers having rear doors.

Other features include: the provision of tilted walls and floors which keep the palletized loads from swaying or shifting during trailer movement, especially when traversing sharp curves in the road; a roof construction free of bracing posts; and door cushioning means to absorb the stress caused by strain on the trailer during movement which cushioning will prevent door warping or binding.

The object of this invention is to provide a side loading trailer.

Another object is to provide a trailer that may be loaded from either side, and which allows full length opening.

Still another object is to provide a side loading trailer having tilted walls and floors adapted to keep palletized loads from swaying or shifting.

Another object is to provide a side loading trailer having a roof construction free of bracing posts.

Still another object is to provide a side loading trailer having door cushioning means to absorb the stress caused by strain on the trailer during movement, which cushioning will prevent door warping or binding.

These and further objects and features of the invention will become apparent from the following description and accompanying drawing wherein:

Fig. 1 is a side elevation view of a trailer embodying the principles of the invention;

Fig. 2 is a perspective view of the trailer of Fig. 1, showing sliding doors thereof positioned to expose the front half of the trailer space;

Fig. 3 is the same but with the sliding doors positioned to expose the rear half of the trailer space;

Fig. 4 is a section view generally as seen along line 4—4 in Fig. 2;

Fig. 5 is a fragmentary section view generally as seen along line 5—5 in Fig. 1;

Fig. 6 is a fragmentary section view generally as seen along line 6—6 in Fig. 1;

Fig. 7 is a fragmentary section view generally as seen along line 7—7 in Fig. 1, but with adjacent doors spaced slightly apart; and Fig. 8 is a perspective view of a locking arrangement used in the trailer of Fig. 1.

Referring now to the drawing, the numeral 11 identifies a trailer representative of an embodiment of the invention, which trailer includes a wheel or truck arrangement 12 located toward the rear end of the trailer, a retractible wheel arrangement 13 located toward the front end of the trailer, a coupling or swivel connection 14 located forwardly of the wheels 13, a pair of longitudinally arranged channel or frame members 16, and an elongated body portion 17 of substantially uniform rectangular cross section throughout its length.

The body portion 17 includes a pair of longitudinally arranged channel, frame or bed members 18, a plurality or series of longitudinally spaced transverse channel, bed or frame members 19 which are secured to and extend between the frame members 18 and are secured atop the frame members 16, a front end wall 21, a rear end wall 22, and a roof panel 23, the ends of the latter being supported upon the end walls 21 and 22. Extending the length of the body portion 17, are a pair of centrally arranged walls or wall panels 24 which are tilted or disposed at an angle to each other, as best seen in Fig. 4. The walls 24 are maintained by a series of longitudinally spaced upright bar or channel members 26, which are arranged on each side of the vertical central plane of the body 17, the upright members in each series being inclined upwardly and inwardly toward said plane and affixed at their converging upper ends to a series of longitudinally spaced cross pieces or transverse roof members 27, and at their lower ends which are spaced from said plane, to a series of longitudinally spaced transverse floor, bar or channel members 28. The channel members 28, which are arranged at a right angle to the channel members 26, and at an angle of approximately 10° to the horizontal, are secured at one end to the frame members 19, and at the other end to a frame member 18, and a floor piece or panel 29 is carried by the channel members 28. As will be apparent, the wall panels 24 are arranged over and secured to upright members 26 and extend from the lower ends thereof to a series of longitudinally spaced diagonal bracing rods, struts or channels 31. These struts are arranged to incline downwardly and inwardly toward said plane at an angle between the cross pieces 27 and the channel members 26, to add stiffening to the body portion 17; the outer ends of struts 31 being secured to the outer ends of the cross pieces 27, and the inner ends of the struts being secured to the upright members 26 at a level spaced below the cross pieces. A dividing wall or partition panel 32 may be positioned perpendicularly to each central wall 24.

It will be seen that the body portion 17, is completely free of bracing posts which are often used in trailers, and which may reduce the useable loading space, or otherwise interfere with cargo handling.

Affixed to the outer ends of the struts 31 and cross pieces 27, as well as to the lower surface of the roof 23 near the edges thereof and extending practically the full length thereof, are a pair of inner and outer tracks formed by channel members 33 and 34 respectively, which channel members are secured together in side by side relationship and the cross-sectional form of which is best seen in Fig. 5. The tracks 33 and 34 are also secured to and extend from the upper corner of one end wall to the corresponding upper corner of the other end wall and are adapted to support sets of contiguous sliding doors 36 and 37 respectively, which are each hung upon the tracks by rollers 38 secured along the top of each sliding door. The doors in each set are individually movable relative to each other as well as to the doors in the adjacent set, and each set of doors is movable relative to the other, as well as from engagement with one end wall to engagement with the other end wall. Further, the individual doors 36 and 37, which are also of uniform height and width, have downwardly extending lips or flanges 39 adapted to slidingly engage the sides of a U-shaped channel member 41, secured atop the frame members 18. Each door 36 and 37 has a pair of straps 42 affixed to the lower inner sides which project downwardly for engagement with the sides of the channel member 41, to keep the doors from swinging outwardly about their upper end.

The doors 36 and 37 each has a lip or flange 43 extending along one side edge, as best seen in Fig. 7, which allow the doors 36 or the doors 37 to nest when pushed together. In such manner, a weather tight enclosure is formed by each set of doors to protect the commodities being transported. It will thus be seen that the doors 36 or 37 may be moved so that any portion of the corresponding door opening leading to the trailer interior, which opening extends along the side of body 17 substantially from one end to the other, may be exposed for loading or unloading purposes. On the other hand, this opening may be completely enclosed when the doors at opposite ends of the aforesaid sets engage the end walls 21, 22 and the doors at the adjacent ends of these sets slightly overlap each other, inasmuch as each set extends slightly more than one half the length of the aforesaid opening.

At each end of the tracks 33, 34, are vertically extending U-shaped channels 44 in which are arranged resilient strips or bumpers 46, preferably made of rubber, serving as buffers for an end door 36 or 37. The bumpers will allow slight shifting movement of the doors to protect the doors against warpage or binding due to strain imposed thereupon as the trailer is moved over rough roadage or around sharp curves.

A simple locking means is provided for maintaining both sets of doors 36 and 37 in closed position. As best seen in Fig. 8, the locking means comprises an L-shaped piece or flange 47 which is permanently secured to the outside of one of the doors 36, and an elongated plate 48 which has a lateral bolt or pin 49 arranged on one side, and an L-shaped portion or tab 51 at one end, having a hole 52 formed therein. The piece or flange 47 has a hole 53 arranged for alignment with the hole 52. The lower end of the plate 48 is arranged to extend into an elongated opening or slot 54 formed in the frame member 18, to allow the pin 49 to pass through aligned holes formed in the flange 39 of the doors 36, 37, and in the U-shaped channel member 41. In such manner, the holes 52 and 53 may be placed in alignment to receive a lock 56, so that the sets of doors 36, 37 are locked in closed position along bed member 18, as shown in Fig. 1.

It will be apparent from the foregoing that the trailer of the invention, as above described satisfies the objectives set forth in the early part of the disclosure.

The foregoing description has been given in detail without thought of limitation since the inventive principles involved are capable of assuming other physical embodiments without departing from the spirit of the invention and the scope of the appended claims.

What is claimed is:
1. An elongated trailer body of substantially uniform rectangular cross section throughout its length and comprising a pair of longitudinally arranged bed members extending substantially the entire length of said body and a series of longitudinally spaced transverse bed members having their outer ends secured to said longitudinal bed members, a pair of end walls secured to and rising from the ends of said longitudinal bed members and enclosing the ends of said body, a series of longitudinally spaced upright members arranged on each side of the longitudinal vertical central plane of said body, the upright members in each series being inclined upwardly toward said plane and having their lower ends spaced from said plane and secured to said transverse bed members, a series of longitudinally spaced transverse roof members secured to the converging upper ends of said upright members, track means secured to and extending from each upper corner of one end wall to the corresponding upper corner of the other end wall and secured to the outer ends of said transverse roof members, a series of longitudinally spaced, diagonal struts arranged on each side of said plane, the struts in each series being inclined downwardly toward said plane and having their outer ends secured to the outer ends of said transverse roof members and said track means and their inner ends secured to said upright members at a point spaced below said transverse roof members, and sliding door means supported by said track means for movement from engagement with one end wall to engagement with the other end wall, the door openings along the sides of the body thereby extending substantially from one end of the body to the other.

2. An elongated trailer body as in claim 1 wherein wall panel means are arranged over and secured to the upright members in each series, said wall panel means extending substantially the length of said upright members and from one end wall to the other, thereby dividing said body into two longitudinal compartments.

3. An elongated trailer body as in claim 2 wherein roof panel means are arranged over and secured to said transverse roof members and track means, said roof panel means extending from one end wall to the other and from one side of said body to the other, thereby enclosing the top of said body.

4. An elongated trailer body as in claim 1 wherein resilient cushioning means are provided on said end walls for engagement with said door means when said door means are moved against said cushioning means, thereby absorbing stress caused by strain on said body and preventing warping or binding of said door means.

5. An elongated trailer body as in claim 1 wherein said track means include a plurality of tracks arranged side by side and secured to and extending from each upper corner of one end wall to the corresponding upper corner of the other end wall, and said door means include a set of doors arranged along each track, each set of doors being movable relative to each other and from engagement with one end wall to engagement with the other end wall for exposing various portions of the corresponding door opening along substantially the entire length of said body or completely enclosing said opening.

6. An elongated trailer body as in claim 1 wherein said track means include inner and outer tracks arranged side by side and secured to and extending from each upper corner of one end wall to the corresponding upper corner of the other end wall, and said door means include a set of contiguous doors arranged along each track and extending slightly more than half the length of the corresponding door opening along the side of said body, the doors in each set being individually movable relative to each other as well as to the doors in the adjacent set and each set of doors being movable relatively to each other as well as from engagement with one end wall to engagement with the other end wall, for exposing any portion of said opening or completely enclosing said opening when the doors at opposite ends of said sets engage said end walls and the doors at the adjacent ends of said sets slightly overlap each other.

References Cited in the file of this patent

UNITED STATES PATENTS

| | | |
|---|---|---|
| 773,126 | Cottman | Oct. 25, 1904 |
| 1,112,738 | Voigt | Oct. 6, 1914 |
| 1,422,846 | Fritts | July 18, 1922 |
| 1,890,257 | Hafner et al. | Dec. 6, 1932 |
| 2,205,636 | Smith | June 25, 1940 |
| 2,482,341 | Holmsten | Sept. 20, 1949 |
| 2,724,611 | Robertson | Nov. 22, 1955 |
| 2,820,667 | Benaroya et al. | Jan. 21, 1958 |
| 2,839,328 | Prickett | June 17, 1958 |
| 2,866,663 | Ashford | Dec. 30, 1958 |

OTHER REFERENCES

"Bottlers' Body," article in "Commercial Car Journal," vol. LXXX, issue 4, of December 1950, pp. 62, 63 and 114.